No. 639,686. Patented Dec. 19, 1899.
A. F. PARKS.
FLUID PRESSURE ENGINE.
(Application filed June 12, 1899.)

(No Model.) 5 Sheets—Sheet 1.

No. 639,686. Patented Dec. 19, 1899.
A. F. PARKS.
FLUID PRESSURE ENGINE.
(Application filed June 12, 1899.)

(No Model.) 5 Sheets—Sheet 2.

Witnesses.
Carl B. Noe
R. R. Nevin

A. F. Parks.
Inventor.
By R. J. McCarty,
Attorney

No. 639,686. Patented Dec. 19, 1899.
A. F. PARKS.
FLUID PRESSURE ENGINE.
(Application filed June 12, 1899.)
(No Model.) 5 Sheets—Sheet 3.

Witnesses:
Carl H. Nv.
Q. R. Nevin,

A. F. Parks,
Inventor.
By R. J. McCarty,
Attorney.

No. 639,686. Patented Dec. 19, 1899.
A. F. PARKS.
FLUID PRESSURE ENGINE.
(Application filed June 12, 1899.)

(No Model.) 5 Sheets—Sheet 4.

WITNESSES:
Carl H. Noe.
R. N. Brumbaugh.

A. F. Parks,
Inventor.
By R. J. McCarty,
Attorney.

UNITED STATES PATENT OFFICE.

ALBERT F. PARKS, OF DAYTON, OHIO, ASSIGNOR OF THREE-FIFTHS TO A. F. BOWMAN, M. P. NISWONGER, AND F. B. COREY, OF SAME PLACE.

FLUID-PRESSURE ENGINE.

SPECIFICATION forming part of Letters Patent No. 639,686, dated December 19, 1899.

Application filed June 12, 1899. Serial No. 720,193. (No model.)

*To all whom it may concern:*

Be it known that I, ALBERT F. PARKS, a citizen of the United States, residing at Dayton, in the county of Montgomery and State of Ohio, have invented certain new and useful Improvements in Fluid-Pressure Engines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in fluid-pressure engines.

The object of the invention is to provide an internally-balanced engine in which a maximum power is obtained from the explosive mixture, the entire engine occupying a minimum space.

In a detailed description reference is made to the accompanying drawings, of which—

Figure 1:
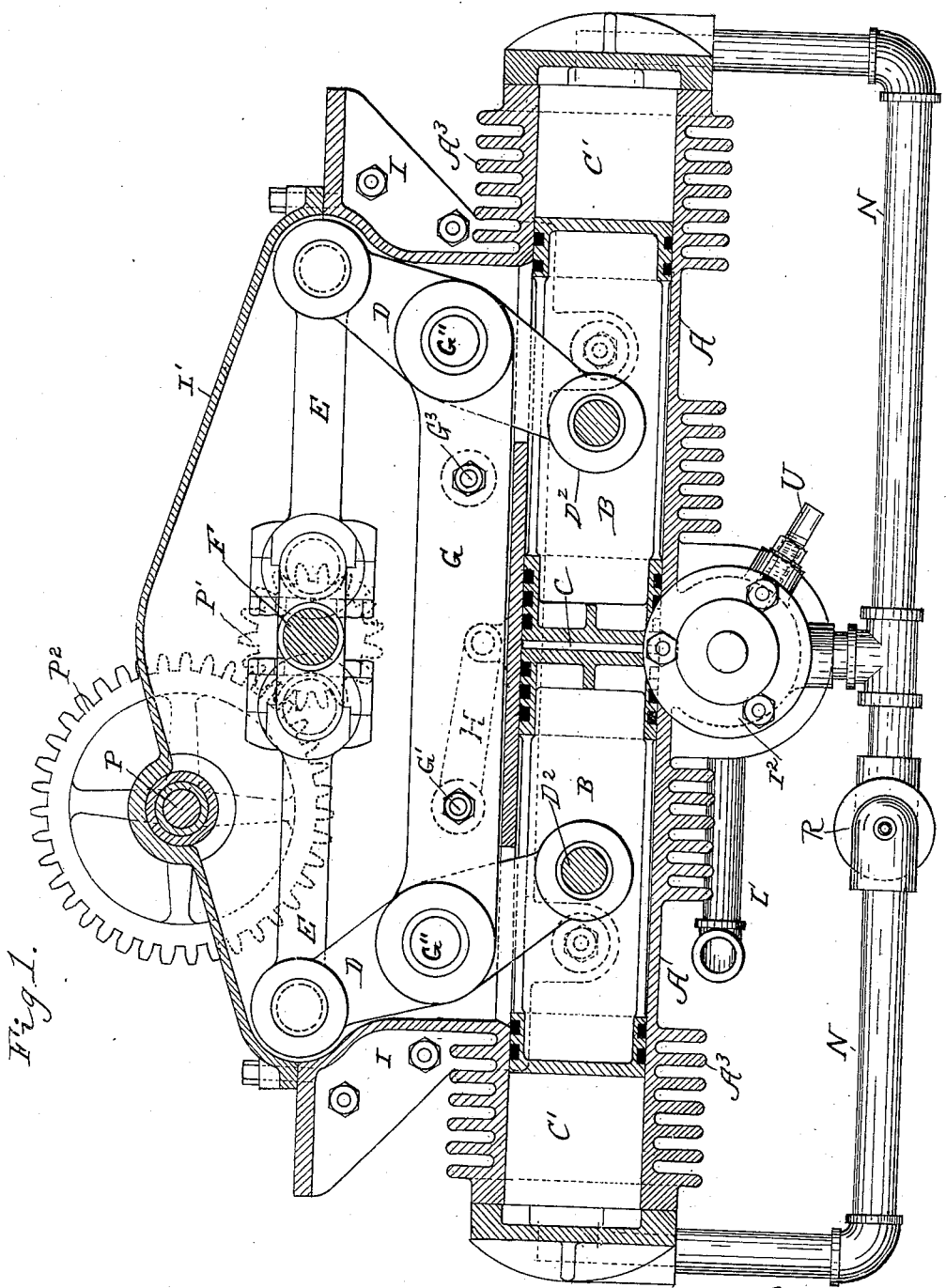
Figure 2:
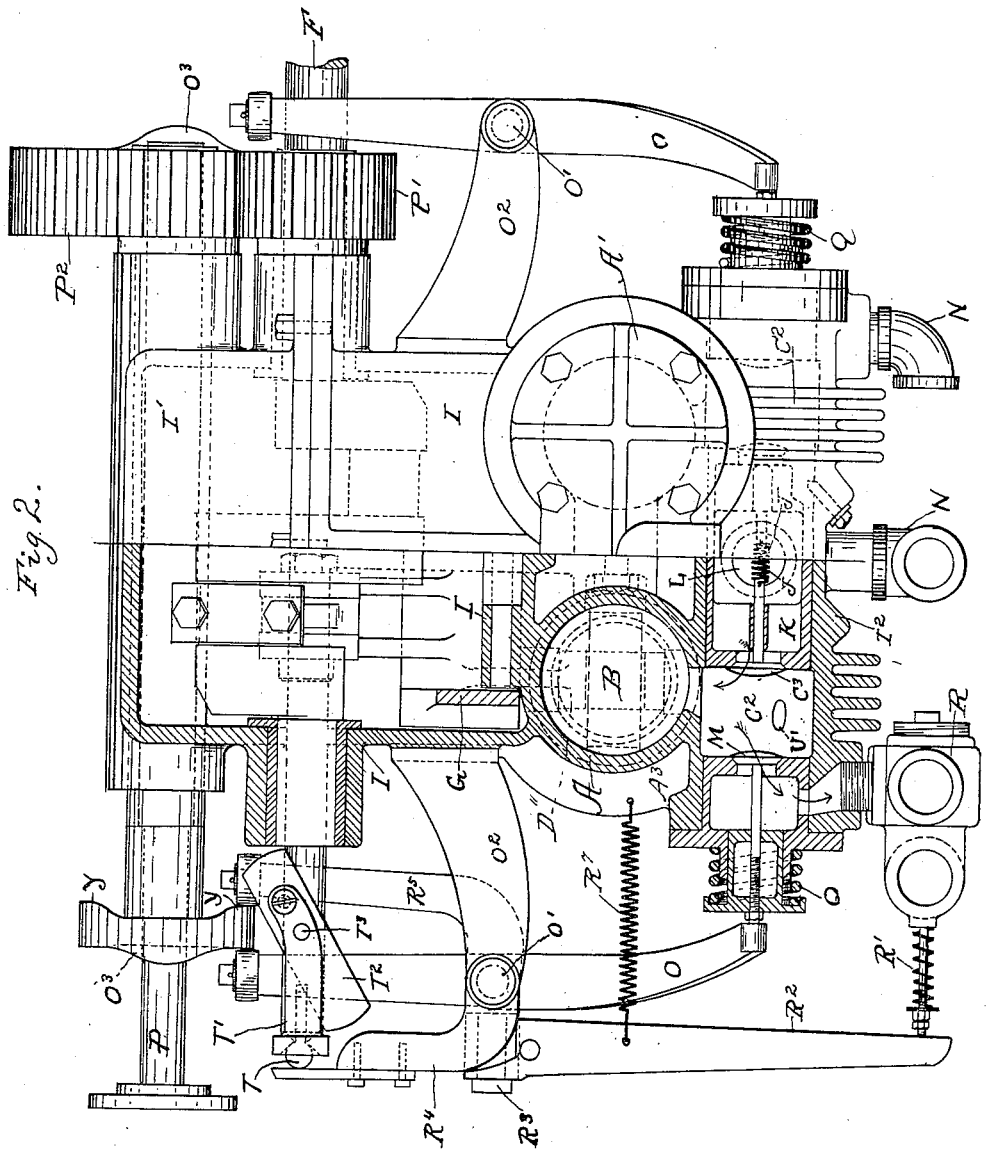
Figure 3:
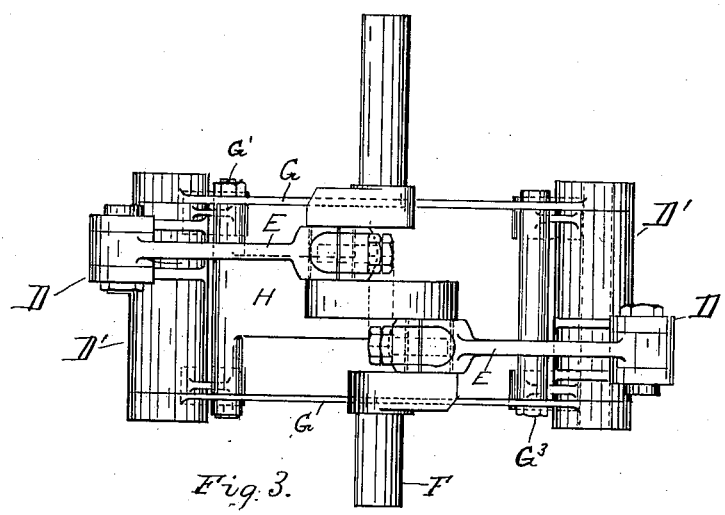
Figure 4:
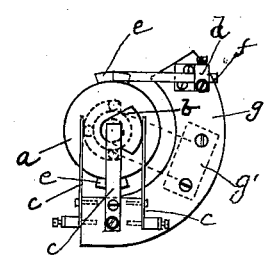
Figure 5:
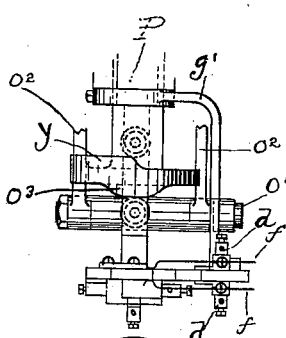
Figure 6:
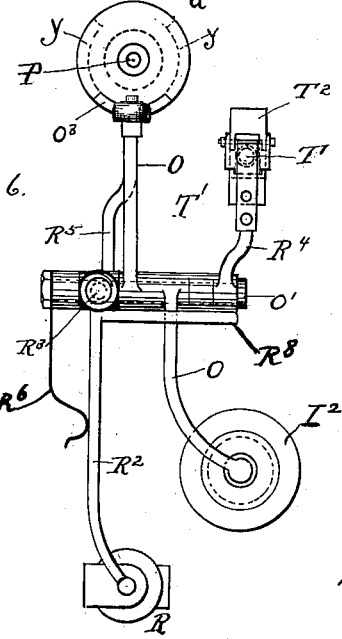
Figure 7:
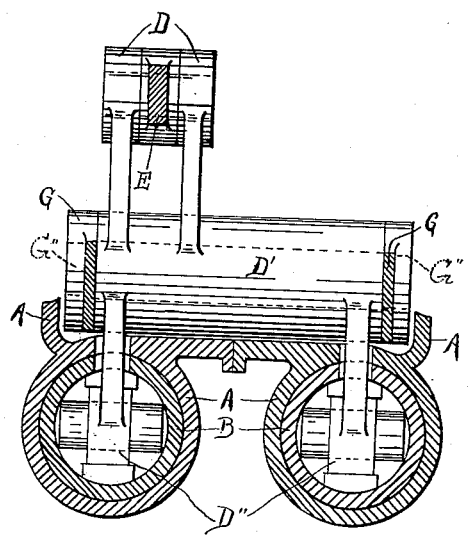
Figure 8:
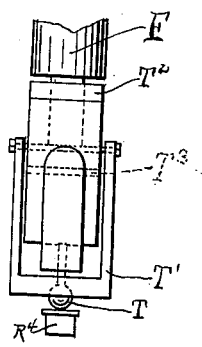
Figure 9:
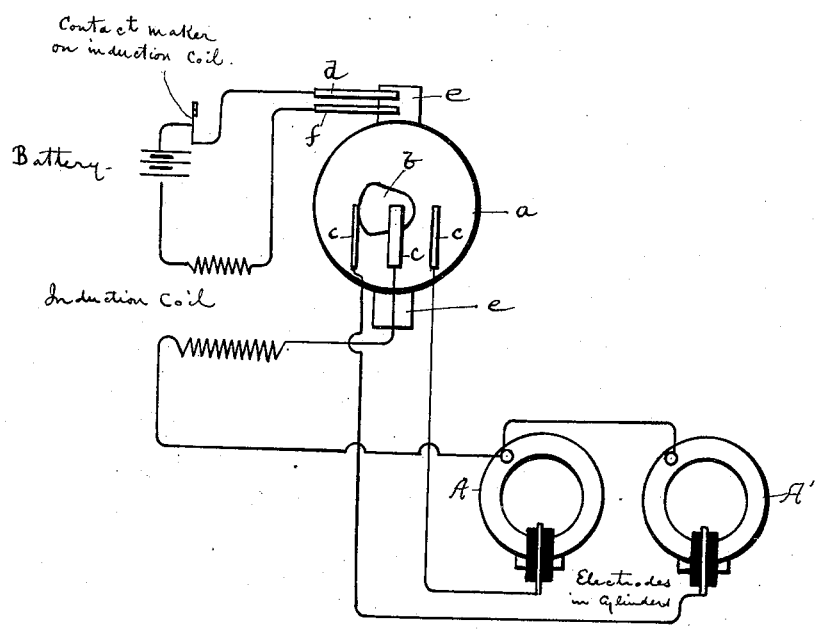

Figure 1 is a longitudinal section through one of the power-cylinders; Fig. 2, an end elevation, partly in transverse section; Fig. 3, a plan view of the cranks, connecting-rods, rockers, and links; Fig. 4, a detail view of the cams and igniting devices; Fig. 5, another view of the cams and igniting devices; Fig. 6, a detail view of the operating-levers for the valves. Fig. 7 is a transverse sectional view of the power-cylinders. Fig. 8 is a top plan view of the governor mechanism. Fig. 9 is a diagram of the electrical connections.

Similar letters of reference designate corresponding parts in the several views of the drawings.

A A' designate two power-cylinders arranged in parallel relation and provided with heat-radiating flanges $A^3$. These cylinders are rigidly connected together by webs and flanges I, which, together with the cover I', form the casing. Within each of said cylinders there are two pistons B B, moving in opposite directions and causing the formation of chambers C C' in the centers and ends of said cylinders. Chambers C are the combustion-chambers, and chambers C' are secondary expansion-chambers. Rockers D D transmit motion from the pistons through connecting-rods E E to the crank-shaft F. From Fig. 3 it will be seen that the upper arms of said rockers are on opposite sides of the centers of their respective hubs D' D'. By this construction it is possible to employ two cranks placed at one hundred and eighty.

G G are two parallel links connecting the fulcrums G'', about which the rockers D D vibrate. Said links are connected by pins $G'$ $G^3$.

H is a position-link, which has one end hinged to the case and the other end pivoted to links G by the pin G'. The purpose of link H is to prevent any excessive endwise movement of the links G G. Communicating with the compression or explosion chambers C in both cylinders and forming a part thereof are auxiliary chambers $C^2$ in the cylindrical casing $I^2$ below the cylinders. These chambers $C^2$ receive the explosive mixture through valves $C^3$, which are held normally closed by springs J and communicate with chamber K. The latter chamber receives the explosive mixture from the source of supply through pipe L. The products of combustion at proper intervals are discharged through valve M into a system of piping N, which communicates with chambers C' in both cylinders. Valves M are opened at proper intervals by levers O, which are fulcrumed at O' on arms $O^2$ and are controlled in their movements by cams $O^3$ on shaft P. Shaft P is rotated at half the speed of crank-shaft F by spur-gears $P'$ $P^2$, which have a ratio of two to one. Valves M are so constructed that they will not open under any pressure in the pipe system N and are held normally closed by coil-springs Q. The products of combustion from piping N and chambers C' are finally liberated through a secondary exhaust-valve R, which is held normally closed by springs R' and is opened at proper intervals by levers $R^2$ and $R^5$, operated by cams Y Y on shaft P. Lever $R^2$ oscillates about a pin $R^3$, carried on lever $R^5$, and is controlled in its several positions by a governor-lever $R^4$. This latter lever is pivoted at O' and is made to move by a ball-pin T, carried on fork T', connected to the governor-weight $T^2$, pivoted at $T^3$ and revolving with the crank-shaft F. Weight $T^2$ is influenced by centrifugal force. The function of spring R⁶ is to press the horizontal arm R⁸, projecting from lever R², against the projecting part of lever R⁴, so that the same will follow any movement of lever R⁴. (See Figs. 2 and 6.) When lever R² is in this position, it is in its normal position. The function of spring R⁷ is to keep the roller end of lever R⁵ (which with lever R² forms a lever fulcrumed at O') in contact with the cam-surface Y Y, so that said lever will be moved by said cam. The explosive mixture is ignited at proper times by igniter U, which passes into chambers C² through openings U'. An electric spark passes between the points of said igniter when proper contacts are made by the following devices.

$a$ is a plate of insulating material carried by shaft P and revolving therewith. Said plate has rigidly attached to it a sector-shaped conducting-piece $b$, which in connection with springs $c$ $c$ $c$ alternately makes connection between the igniters U and secondary of induction-coil, one igniter being in connection at a time. Also carried on the periphery of plate $a$ and situated one hundred and eighty degrees from each other are two blocks $e$ of conducting material, which in certain positions are simultaneously in contact with springs $f$ $f$. Wires leading from binding-posts $d$ $d$ connect said springs $f$ $f$ to a source of electricity and to the primary of the before-mentioned induction-coil. Springs $c$ $c$ $c$ and $f$ $f$ are carried by an insulated plate $g$, supported on arm $g'$, the latter—to wit, arm $g'$—being capable of rotation about the axis of shaft P for the purpose of changing the time of ignition with relation to the position of the cranks. When the engine is running at normal speed, the secondary exhaust-valve R is opened at regular intervals; but when the speed exceeds normal, the arm R², operating said valve, is displaced to one side by the action of the governor, thus preventing the opening of valve R upon the next inward movement of the end of arm R². This condition exists until the speed of the engine returns to normal.

The operation of the engine is what is known as the "Otto cycle" with the following modifications: Upon the admission, compression, and ignition of the explosive mixture in chamber C the rise of pressure forces the pistons to their extreme outward positions. At this moment the exhaust-valve M is opened, permitting free communication between chambers C and C'. At this time there is in chamber C in one cylinder and in chamber C' in the two cylinders a certain pressure per square inch. This gives a pressure on two pistons tending to move the same in one direction and on the four pistons tending to move the same in opposite directions. This unbalanced force will therefore move the pistons toward the center of the engine, thereby exhausting the gases from chamber C into piping N and chambers C'. When the pistons have arrived at the inner end of their stroke, valve M closes and valve R opens, allowing gases in the piping N and chambers C' to be forced out to the atmosphere by the next outward stroke of pistons. While this cycle of operation has been existing in one cylinder on the stroke corresponding with the first expansion-stroke, explosive mixture has been drawn into chamber C in the other cylinder. On the next inward stroke this mixture is compressed and exploded when the pistons reach their extreme inward positions. The next outward stroke is the expansion-stroke for this cylinder. Exhaust-valve M, connecting said cylinder with the system of piping N and chambers C,' is opened at the outward limit of said stroke, allowing upon the next inward stroke the expulsion of the gases from the chamber C into piping N and chambers C'. The exhaust-valve M for this cylinder then closes, the secondary exhaust-valve R is opened, and the gases are expelled into the atmosphere by the next outward stroke of the pistons.

Having described my invention, I claim—

1. In a fluid-pressure engine, the combination with two parallel power-cylinders communicating at their ends, two oppositely-movable pistons in each of said cylinders, and charge-inlets to said cylinders between the pistons, of a system of piping connecting the spaces between the pistons and the ends of the cylinders, and exhaust-valves, whereby the spaces between the pistons constitute combustion-chambers, and the ends of the cylinders constitute secondary expansion-chambers.

2. In a fluid-pressure engine, the combination with two parallel power-cylinders communicating at their ends, two oppositely-movable pistons in each of said cylinders, and valve-controlled auxiliary chambers communicating with the spaces between the pistons and through which said spaces are charged and exhausted, of a system of piping connecting said auxiliary chambers with the ends of the cylinders, and exhaust-valves controlling the periods of such communication, whereby the spaces between the pistons constitute combustion-chambers, and the ends of the cylinders constitute secondary expansion-chambers.

3. In a fluid-pressure engine, the combination with two parallel power-cylinders communicating at their ends, two oppositely-movable pistons in each of said cylinders, and auxiliary admission and exhaust chambers communicating with the spaces between said pistons, and an initial receiving-chamber communicating with said auxiliary chambers, of a system of piping connecting the said auxiliary chambers with the ends of the cylinders, and exhaust-valves, whereby the spaces between the pistons constitute combustion-chambers, and the ends of the cylinders constitute secondary expansion-chambers.

4. In a fluid-pressure engine, the combination with two parallel power-cylinders communicating at their ends, two oppositely-movable pistons in each of said cylinders, and charge-inlets to said cylinders between the pistons, of a system connecting the spaces between the pistons with the ends of the cylinders, and valves controlling the periods of communication between such parts of the cylinders, whereby the spaces between the pistons constitute combustion-chambers, and the ends of the cylinders constitute secondary expansion-chambers.

5. In a fluid-pressure engine, the combination with two parallel power-cylinders communicating at their ends, two oppositely-movable pistons in each of said cylinders, auxiliary chambers forming admission and exhaust passages for the spaces between the pistons, and an initial admission-chamber common to said auxiliary chambers, of a system of piping connecting said auxiliary chambers with the ends of the cylinders, valves controlling the passage of the products of combustion from the spaces between the pistons and said auxiliary chambers to said piping, and means for actuating said valves at proper times.

6. In a fluid-pressure engine, the combination with two parallel power-cylinders communicating at their ends, and two oppositely-movable pistons in each of said cylinders, an auxiliary chamber communicating with the central part of each cylinder and forming an admission and exhaust passage therefor, of a system of piping connecting said auxiliary chambers with the ends of the cylinders, exhaust-valves controlling the passages from said auxiliary chambers to said piping whereby the spaces between the pistons constitute combustion-chambers, and the ends of the cylinders constitute secondary expansion-chambers, a secondary exhaust-valve controlling the liberation of the gases from the piping, and means actuated by the governor for opening said valve.

7. In a fluid-pressure engine, the combination with two parallel power-cylinders, and two oppositely-movable pistons in each cylinder, of rockers pivoted to and moving with said pistons, and links connecting said rockers, substantially as described.

8. In a fluid-pressure engine, the combination with two parallel power-cylinders, and two oppositely-movable pistons in each cylinder, of rockers pivoted to and moving with said pistons, links upon which said rockers are fulcrumed, and a position-link limiting the motion of said rockers and connecting-links.

In testimony whereof I affix my signature in presence of two witnesses.

ALBERT F. PARKS.

Witnesses:
WILLIAM POHLMANN,
A. F. BOWMAN.